United States Patent [19]
Jaillet et al.

[11] Patent Number: 4,709,827
[45] Date of Patent: Dec. 1, 1987

[54] HOME CONTAINER

[76] Inventors: Jeannine Jaillet; Georges Jaillet, both of 19 boulevard de Bercy, 75012 Paris, France

[21] Appl. No.: 947,809

[22] Filed: Dec. 30, 1986

[30] Foreign Application Priority Data

Jan. 15, 1986 [FR] France .................................. 86 00495

[51] Int. Cl.$^4$ .............................................. B65D 6/12
[52] U.S. Cl. .................................... 220/4 A; 220/4 B; 220/6; 220/7; 220/334; 220/403; 119/95
[58] Field of Search .................... 220/4 A, 6, 7, 403, 220/334, 4 B; 119/95, 58, 61

[56] References Cited

U.S. PATENT DOCUMENTS

| | | | |
|---|---|---|---|
| 993,169 | 5/1911 | Hudson | 220/4 B |
| 1,208,393 | 12/1916 | Smart | 220/4 A |
| 2,620,790 | 12/1952 | Richardson | 220/4 A |
| 3,828,966 | 8/1974 | Martin | 220/6 |
| 4,154,355 | 5/1979 | Shackelford | 220/4 B |
| 4,270,490 | 6/1981 | Kopp | 220/4 B |

*Primary Examiner*—Joseph Man-Fu Moy
*Attorney, Agent, or Firm*—Gerald J. Ferguson, Jr.; Michael P. Hoffman; Michael J. Foycik, Jr.

[57] ABSTRACT

A home container in accordance with the invention comprises two container elements (1) each comprising a bottom (2) and a side wall (3) extending along a portion of the bottom and on either side of a bottom division edge which does not have a side wall, with hinged connection means (9, 10) interconnecting the two container elements (1) about a hinge axis adjacent to the top edge (4) of the two ends of the side wall (3) on either side of the bottom division edge, and retaining means for holding the bottom division edges of the two associated container elements against each other. It is characterized by bag-retaining means (6) adjacent to the ends of the side walls (3) of the container elements (1). When the container is to be emptied, a flexible bag is fastened to the bag-fastening means and the container elements are pivoted relative to each other. Materials contained in the container then fall directly into the bag.

9 Claims, 5 Drawing Figures

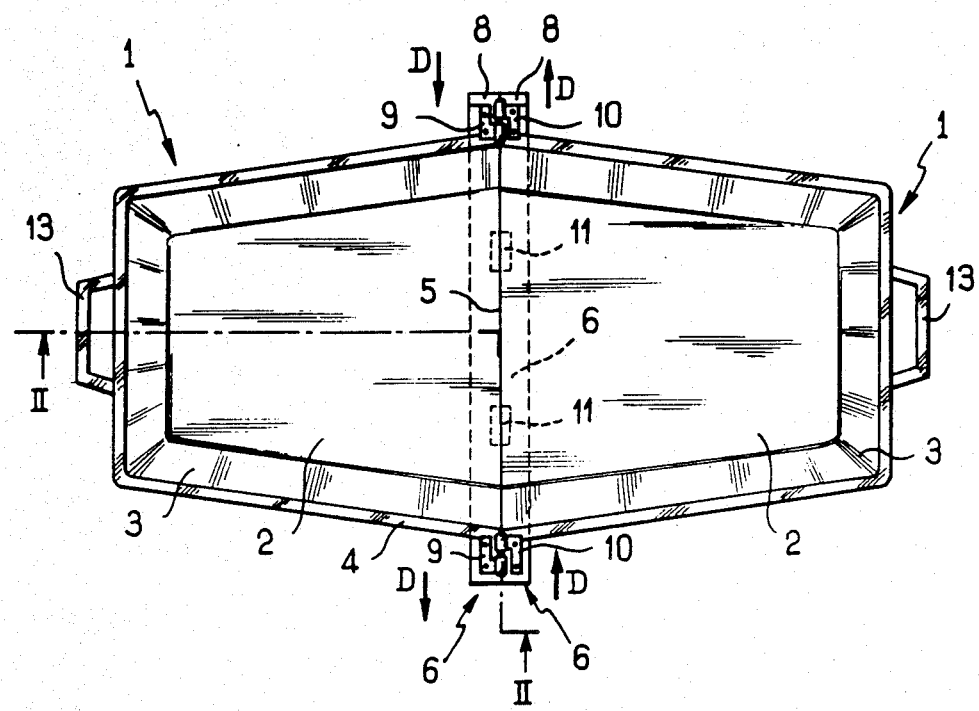
FIG_1
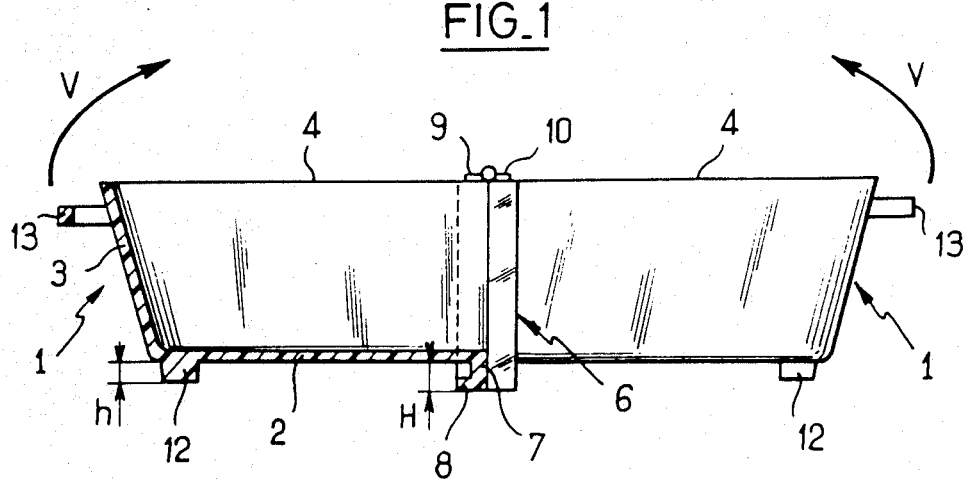
FIG_2

HOME CONTAINER

The present invention relates to a home container for transporting and dumping various materials, and particularly, but not exclusively, waste materials, and in particular cat litter.

BACKGROUND OF THE INVENTION

There are numerous occasions on which a home container is used for transporting and dumping various materials. In particular, when collecting cat excrement, a home container is generally provided in which litter is disposed in the form of granules for absorbing liquid excrement and for enveloping solid excrement by adhering thereto. When a cat leaves excrement in the litter, it turns over the litter in order to coat the excrement with granules of litter. It often happens during this movement that the excrement comes into contact with the bottom or sides of the container and adheres lightly thereto. When the container is to be emptied in order to change the litter, it is often difficult to unstick the excrement which has adhered to its walls while keeping the container suitably oriented in order to ensure that the unstuck excrement falls into the intended recipient, e.g. a dust bin or a bin liner bag. In particular, when attempting to unstick excrement by striking the edge of the home container against the edge of a dust bin, it often happens that the excrement comes unstuck at the moment when the container is no longer over the dust bin, and a particularly disagreeable cleaning operation then becomes necessary.

Home containers are already known, in particular for storing waste, comprising two container elements each comprising a bottom and a side wall extending around a portion of the bottom and extending upto first and second ends on either side of a bottom division edge which does not include a side wall, hinged connection means interconnecting the two container elements about a hinge axis adjacent to a top edges of the ends of the side wall on either side of the bottom division edge, and retaining means for holding the bottom division edges of the associated container elements against each other.

Thus, when the home container is to be emptied, it is folded about the hinged connection means so that the material contained in the container is dumped centrally. However, even when dumping centrally, it may happen that the opening is not exactly over the dust bin so the above-mentioned drawback is not avoided.

An aim of the present invention is to provide a home container for storing and dumping materials which tend to adhere to the walls of the container, and for providing handling security when emptying the container.

SUMMARY OF THE INVENTION

In order to achieve this aim, the invention provides a home container of the type defined above having two hinged elements, with the container further including bag-fastening means adjacent to the ends of the side walls of the container elements.

Thus, regardless of the movements performed with the container, the bag follows these movements. In particular, materials stuck to the sides can easily be unstuck by banging the elements of the container against each other without dropping the materials outside the bag.

In an advantageous version of the invention, the hinged connection means can be disassembled by moving the two associated container elements relative to each other along a direction parallel to the hinge axis of said container elements. This makes the container easy to disassemble for storage purposes.

According to another advantageous aspect of the invention, the container includes a thrust member disposed in the vicinity of the bottom division edge of each container element and projecting outwardly from the bottom. Thus, when the container is placed on a plane surface, the weight of the container elements acts to hold the elements so that their bottom division edges are pressed against each other.

In a preferred embodiment of the invention, the bag-fastening means comprise an outwardly projecting rim on the side wall and the bottom of each container element running along at least a portion of the bottom division edge and of the adjacent ends of the side wall. Thus, not only can a bag be suspended from the edges of the rim, but also the edge of the bag rests against the container rim so that the bag is opened widely by pivoting the container elements relative to each other.

According to yet another advantageous aspect of the invention, the bag retaining means includes hooks spaced away from the articulated connection means and having clamping surfaces which extend parallel to the hinge axis of the connection means and side openings each at one end of a respective clamping surface. Thus, bending the side wall extending between the hinge connection means and the hooks serves to unclamp the hooks and to pivot the container elements relative to each other.

BRIEF DESCRIPTION OF THE DRAWINGS

Embodiments of the invention are described by way of example with reference to the accompanying drawings, in which:

FIG. 1 is a plan view of a first embodiment of a home container in accordance with the invention;

FIG. 2 is a side view shown partially in section on a line II—II of FIG. 1;

DESCRIPTION OF PREFERRED EMBODIMENTS

Figure 3:
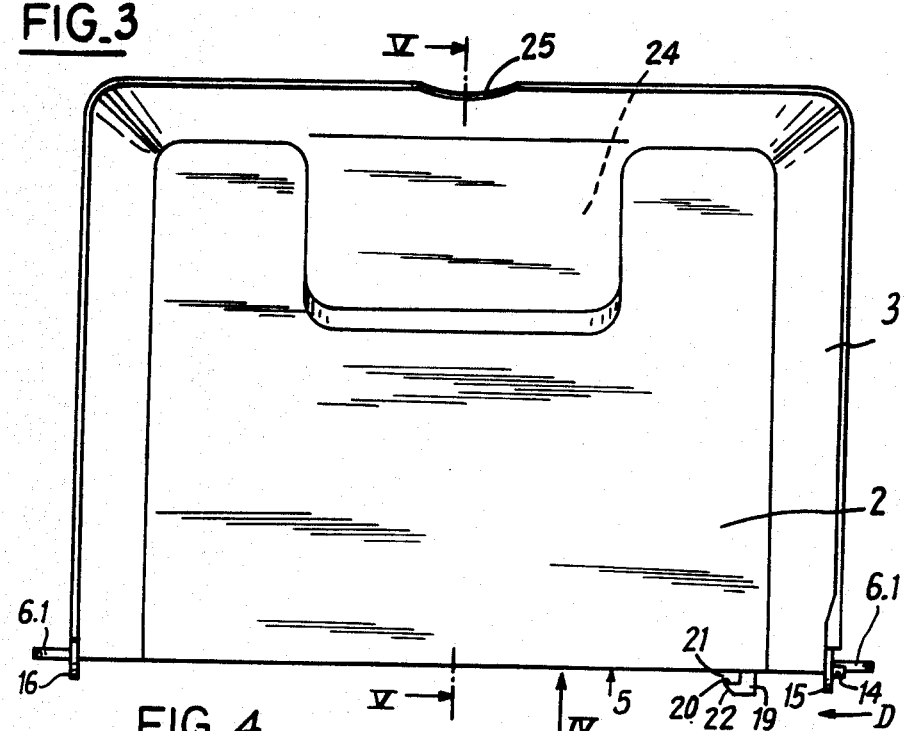
FIG. 3 is a plan view of a single container element in accordance with a second embodiment of the invention.

With reference to FIGS. 1 and 2, a first home container in accordance with the invention comprises two container elements generally designated 1, each of which comprises a bottom 2 and a side wall 3 running along a portion of the bottom and sloping outwardly from the bottom towards the top edge 4 of each container element. The ends of the side wall 3 are disposed at either end of the bottom division edge 5 which does not include a side wall.

In the embodiment shown, each container element 1 is generally flared in shape from an opposite end to the bottom division edge 5 towards said edge. Thus, by virtue of the sloping side wall 3 and the flare of each of the container elements 1, the container elements may be stored by stacking them in one another.

Adjacent to the ends of the side walls 3 of the container elements, there are bag-fastening means formed by an L-shaped rim generally designated by 6, and comprising a first branch 7 extending perpendicularly outwardly from the side wall 3 of each container element in the vicinity of the end of the side wall 3, and a second branch 8 spaced apart from the side wall 3 and extending towards an opposite end of each container element 1. The L-shaped rim 6 preferably also extends beneath the bottom of each container element 1.

The container further includes hinge connection means interconnecting the two container elements 1 about a hinge axis adjacent to the top edge 4 at the ends of the side wall 3. These hinge connection means comprise two hinge pins 9 fixed to one of the container elements 1 at the top end of the branch 7 of an L-shaped rim 6 and associated with two hinge plates 10 fixed on the other container element 1 at the top end of the branch 7 of its L-shaped rim 6. The hinge connection means are thus capable of being disassembled by moving the two associated container elements 1 along a direction D parallel to the hinge axis of these two container elements. In order to hold the container elements to each other in their material-receiving position, the container preferably includes retaining means for holding the bottom division edges 5 of the two associated container elements against each other. These retaining means are formed, for example, by two-part magnetic latches 11, with each latch part being fixed to one of the container elements 1 facing a corresponding part mounted on the other container element. For example, the magnetic latch parts may be fixed in cavities provided in the first branches 7 of the L-shaped rims 6.

It may be observed that the portions of the rims 6 extending beneath the bottoms 1 of the container elements constitute bearing members disposed in the vicinity of the bottom division edge 5 of each container element and extending outwardly from the bottom. In this embodiment, the container includes legs 12 disposed at the ends of the container elements and extending over a height h which is less than the height H of the rims 6 constituting the bearing member. Handles 13 extending horizontally outwardly from the side wall 3 are provided at the ends of the container elements 1.

The container in accordance with the invention operates as follows: with the two container elements being associated by the hinged connection means, and being held against each other by the retaining means, the container is in the form of a tray suitable for receiving materials, for example cat litter. It may be observed that by virtue of the relative height and disposition of the bearing member constituted by the rims 6 and the legs 12, the weight of the container elements acts on the hinges of the connection means in order to hold the container elements against each other. When the container is to be emptied, it is taken to a position above the receptacle intended for receiving the materials contained in the container and a force is then exerted on the handles 13 in the direction of arrows V (see FIG. 2) tending to bring the top edges 4 of the container elements 1 towards each other, thereby opening the bottom of the container along the bottom division edges 5 and allowing it to be emptied. If the materials stored therein remain stuck to the bottom or the side walls of the container, the top edges 4 of the container elements 1 are banged against each other, thereby setting up a shock wave which unsticks the materials. If the container is to be emptied into a flexible bag, two opposite sides of the bag opening are preferably fastened to the top portions of the second branches 8 of the rims 6 and the bag hangs naturally beneath the container whose bottom division edge 5 is surrounded by the sides of the bag opening. In this case, when the top edges 4 of the container elements 1 are moved toward each other, the second branches 8 of the portions of rims 6 which extend beneath the bottom 2 press on the sides of the bag opening and hold them apart to receive the material.

Figure 4:
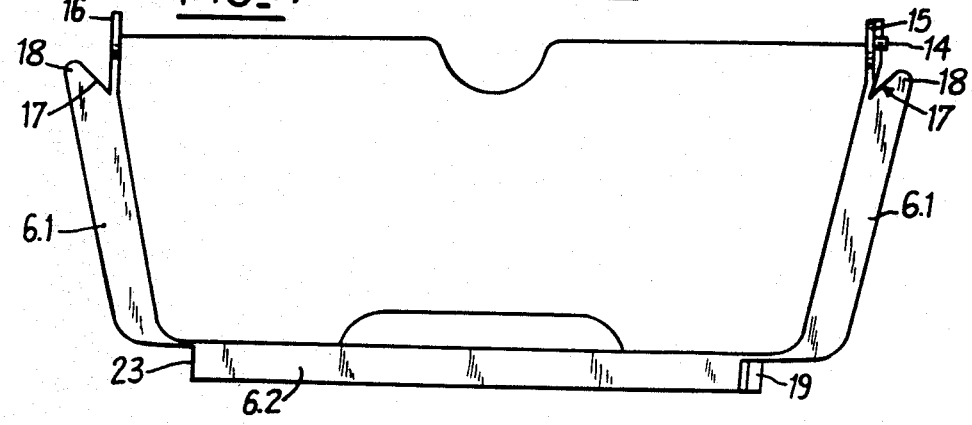
FIG. 4 is an end view of the FIG. 3 container element seen along arrow IV of FIG. 3.
Figure 5:
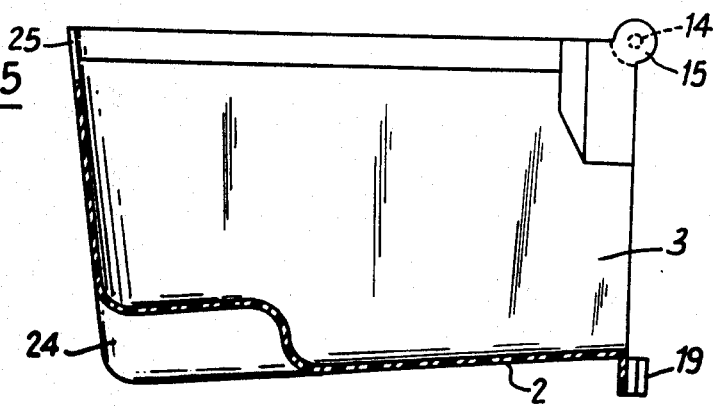
FIG. 5 is a section view on line V—V of FIG. 3.

FIGS. 3 to 5 show a second embodiment of a container in accordance with the invention. As in the first embodiment, each container element comprises a bottom 2 which is partially surrounded by a side wall 3 whose ends coincide with a bottom division edge 5. The hinged connection means are constituted, in this case, by a peg 4 mounted on a lug 15 at each top corner of the side wall 3 and engaging, when assembled, in a hole through a lug 16 disposed on the other end of the side wall 3 of the associated container element. As in the case shown in FIGS. 1 and 2, the two container elements are identical, thereby greatly facilitating manufacture.

In this second embodiment of the invention, the bag-fastening means comprise three portions of plane rim. Two rim portions 6.1 extend along the end edges of the side wall 3 and project outwardly therefrom. The third rim portion 6.2 extends beneath the bottom along a portion of the length thereof and projects outwardly relative to the bottom. The two rim portions 6.1 extending along the side wall include sloping edges 17 at their top ends in the vicinity of the connection means, said sloping edges 17 forming two upwardly projecting teeth 18 for holding a flexible bag more securely when it is being fixed to the container, prior to emptying the container. The means for retaining the container elements against each other are constituted by respective hooks 19 on each container element. Each hook 19 projects from one end of the rim portion 6.2 and includes a latching surface 20 extending parallel to the peg 14 and delimiting, together with the rim portion 6.1, a side opening 21 at one end of the latching surface 20. The side opening 21 is directed in the same direction as the direction D for dismounting the hinged connection means. This hook also includes a chamfered outer surface 22 in the vicinity of its free end. The dimensions of the hook 19 are such that during assembly, its chamfered portion 22 engages the opposite end edge 23 of the rim portion 6.2 of the associated container element.

It can be seen in the above-described configuration with the hooks 19 at a distance from the hinged connection means 14 that it is possible to displace the two associated container elements laterally relative to each other in a direction opposite to the disassembly direction D by bending the side wall portions lying between the connection means and the hooks.

During assembly, each peg 14 is engaged in the hole through the corresponding ear 16 of the associated container element and then the two container elements are folded down towards each other. When the chamfered portions 22 of the hooks 19 come into contact with the end edges 23 of the corresponding rim portions 6.2, the side walls bend in a direction opposite to the disassembly direction, thereby facilitating interconnection of the container elements and enabling the hooks 19 to engage on the corresponding ends of the rim portions 6.2.

The opposite ends of the bottom from its division edges 5 presently include respective cavities 24 and the side walls include notches 25 enabling each container element to be grasped in the hand. In order to empty the container, each of these ends should be grasped and the container elements should be thrust relative to each other in a direction opposite to the direction of the side openings 21 of the hooks until the hooks are disengaged from the corresponding rim portions 6.2. The two container elements can then be pivoted relative to each other in order to dump the material centrally and to hold the bag in the open position by the rim portions 6.1 and 6.2 pressing against the inside wall of the bag.

Naturally, the invention is not limited to the above-described embodiments, and numerous variant embodiments can be provided which will occur to the person skilled in the art. In particular, although the containers shown in the figures are substantially rectangular in shape, a container in accordance with the invention could be polygonal or round in shape. Similarly, although the container elements shown are identical, thereby reducing the cost of mass production, the container elements could be of different shapes or of different sizes.

The means for retaining the container elements in their open position may be very varied, for example they could be constituted by hooks fixed to the side walls of the container elements or by springs which could be incorporated in the hinges providing the hinged connections between the container elements, or else they could be formed by snap-fastening shapes disposed along the edges of the side walls of the container elements or along the bottom division edges thereof.

Although the advantages of the invention have been emphasized more particularly with reference to using the container as a cat litter tray, a container in accordance with the invention is not limited to this application. It could be made with a bottom having openings for allowing the materials contained therein to drip dry and then allowing them to be dumped into another receptacle without it being necessary to use the hand or a utensil to unstick materials which may have stuck to the sides of the container. In this context, it may be observed that the container may be made of various materials, for example it could be molded from plastic material.

We claim:

1. A home container comprising two container elements each comprising a bottom and a side wall extending around a portion of the bottom and extending upto first and second ends on either side of a bottom division edge which does not include a side wall, hinged connection means interconnecting the two container elements about a hinge axis adjacent to a top edges of the ends of the side wall on either side of the bottom division edge, and retaining means for holding the bottom division edges of the associated container elements against each other, the container including bag-fastening means adjacent to the ends of the side walls of the container elements.

2. A home container according to claim 1, wherein the hinged connection means are capable of being disassembled by moving the associated container elements relative to each other along a direction parallel to the hinge axis of said container elements.

3. A home container according to claim 2, including a bearing member disposed in the vicinity of the bottom division edge of each container element and projecting outwardly from the bottom.

4. A home container according to claim 1, wherein the bag fastening means comprise a rim projecting outwardly from the side wall and from the bottom of each container element along at least a portion of the bottom division edge and of the adjacent ends of the side wall.

5. A home container according to claim 4, wherein the rim is L-shaped having a first branch extending outwardly perpendicularly from the side wall of each container element in the vicinity of an end of the side wall, and a second branch spaced from the side wall and extending towards the opposite end of each container element.

6. A home container according to claim 4, wherein in the vicinity of the hinged connection means, the rim includes an end forming an upwardly directed tooth.

7. A home container according to claim 1, wherein the retaining means comprise hooks spaced away from the hinged connection means, said hooks having latching surfaces extending parallel to the hinge axis of the connection means and side openings at one end of each latching surface.

8. A home container according to claim 7, wherein the hinged connection means are capable of being disassembled by moving the associated container elements relative to each other along a direction parallel to the hinge axis of said container elements, and wherein the side openings of the hooks are turned towards the same direction as the direction for disassembling the hinged connection means.

9. A home container according to claim 7, wherein the bag fastening means comprise a rim projecting outwardly from the side wall and from the bottom of each container element along at least a portion of the bottom division edge and of the adjacent ends of the side wall, and wherein the hooks of a container element are carried by the rim of said element and co-operate with an end of a rim portion extending along the bottom of the associated container element.

* * * * *